(12) United States Patent
Kwon et al.

(10) Patent No.: US 10,009,665 B2
(45) Date of Patent: Jun. 26, 2018

(54) METHOD AND DEVICE FOR TRANSMITTING/RECEIVING BROADCAST SIGNAL

(71) Applicant: LG ELECTRONICS INC., Seoul (KR)

(72) Inventors: Woosuk Kwon, Seoul (KR); Sejin Oh, Seoul (KR); Kyoungsoo Moon, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days. days.

(21) Appl. No.: 14/910,086

(22) PCT Filed: Mar. 11, 2015

(86) PCT No.: PCT/KR2015/002363
§ 371 (c)(1),
(2) Date: Feb. 4, 2016

(87) PCT Pub. No.: WO2015/137727
PCT Pub. Date: Sep. 17, 2015

(65) Prior Publication Data
US 2016/0182975 A1  Jun. 23, 2016

Related U.S. Application Data

(60) Provisional application No. 61/951,507, filed on Mar. 11, 2014.

(51) Int. Cl.
*H04N 21/854* (2011.01)
*H04N 21/2362* (2011.01)
(Continued)

(52) U.S. Cl.
CPC ....... *H04N 21/854* (2013.01); *H04N 21/2362* (2013.01); *H04N 21/631* (2013.01); *H04N 21/64322* (2013.01)

(58) Field of Classification Search
CPC ............ H04N 21/854; H04N 21/2362; H04N 21/631; H04N 21/64322
(Continued)

(56) References Cited

U.S. PATENT DOCUMENTS

2002/0001315 A1  1/2002  Tran et al.
2002/0142730 A1* 10/2002  Hsu ............... H04L 12/1877
455/72
(Continued)

FOREIGN PATENT DOCUMENTS

CN         1270496 C    8/2006
CN       101237419 A    8/2008
(Continued)

OTHER PUBLICATIONS

Aoki et al., "Effective Usage of MMT in Broadcasting Systems," IEEE International Symposium on Broadband Multimedia Systems and Broadcasting (BMSB), Oct. 8, 2013, pp. 1-6.
(Continued)

*Primary Examiner* — Nathan Flynn
*Assistant Examiner* — Caroline Somera
(74) *Attorney, Agent, or Firm* — Birch, Stewart, Kolasch & Birch, LLP

(57) ABSTRACT

A broadcast signal transmitting device, according to one embodiment of the present invention, comprises: a header compression unit for performing a header compression on internet protocol (IP) packets including broadcast data, so as to configure full header packets and compressed header packets; a full header information extraction unit for extracting full header information from the full header packets; a signaling data generation unit for generating signaling packets including the full header information; and a broadcast signal transmission unit for transmitting the compressed header packets through a first transmission path through (Continued)

which general broadcast data is transmitted, and transmitting the signaling packets through a separate second transmission path which is different from the first transmission path.

8 Claims, 7 Drawing Sheets

(51) Int. Cl.
*H04N 21/63* (2011.01)
*H04N 21/643* (2011.01)

(58) Field of Classification Search
USPC .......................................................... 725/118
See application file for complete search history.

(56) References Cited

U.S. PATENT DOCUMENTS

| | | | |
|---|---|---|---|
| 2004/0042456 A1 | 3/2004 | Dittmann et al. | |
| 2004/0071096 A1* | 4/2004 | Na | H04L 1/0029 370/252 |
| 2005/0018615 A1* | 1/2005 | Itoh | H04L 12/1881 370/252 |
| 2005/0195750 A1 | 9/2005 | Le et al. | |
| 2006/0104266 A1* | 5/2006 | Pelletier | H03M 7/30 370/389 |
| 2007/0153788 A1 | 7/2007 | Yi et al. | |
| 2008/0008175 A1 | 1/2008 | Park | |
| 2009/0034528 A1* | 2/2009 | Park | H04L 69/22 370/392 |
| 2010/0172375 A1* | 7/2010 | Rochon | H04L 69/04 370/474 |
| 2011/0032952 A1* | 2/2011 | Rochon | H04L 69/04 370/477 |
| 2012/0177064 A1* | 7/2012 | Shi | H04L 69/04 370/477 |
| 2013/0039278 A1* | 2/2013 | Bouazizi | H04L 65/4076 370/328 |
| 2013/0279380 A1* | 10/2013 | Hong | H04H 20/72 370/310 |
| 2015/0063357 A1* | 3/2015 | Hwang | H04L 5/0044 370/392 |

FOREIGN PATENT DOCUMENTS

| | | |
|---|---|---|
| CN | 101605304 A | 12/2009 |
| CN | 101969666 A | 2/2011 |
| CN | 102318282 A | 1/2012 |
| CN | 102388648 A | 3/2012 |
| EP | 1681898 A1 | 7/2006 |
| KR | 10-2013-0127990 A | 11/2013 |
| WO | WO 03/067833 A1 | 8/2003 |
| WO | WO 2010/121409 A1 | 10/2010 |

OTHER PUBLICATIONS

International Telecommunications Union, "Multiplexing Scheme for Variable-Length Packets in Digital Multimedia Broadcasting Systems," Recommendation ITU-R BT.1869, BT Series Broadcasting Service (television), Geneva, Mar. 2010, pp. 1-18 (21 pages total.).

Aoki et al., "A New Transport Scheme for Hybrid Delivery of Content Over Broadcast and Broadband," IEEE International Symposium on Broadband Mulitmedia Systems and Broadcasting (BMSB 2011), 2011, pp. 1-6.

* cited by examiner

FIG. 4

CID_header_type assignment value (a)

| Value | Description |
|---|---|
| 0x00 - 0x1F | Reserved |
| 0x20 | Full header of packet with IPv4 and UDP headers |
| 0x21 | Compressed header of packet with IPv4 and UDP headers |
| 0x22 - 0x5F | Reserved |
| 0x60 | Full header of packet with IPv6 and UDP headers |
| 0x61 | Compressed header of packet with IPv6 and UDP headers |
| 0x62 - 0xFF | Reserved |

(b) 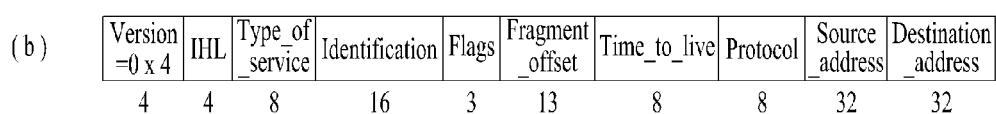

| Version =0 x 4 | IHL | Type_of _service | Identification | Flags | Fragment _offset | Time_to_live | Protocol | Source _address | Destination _address |
|---|---|---|---|---|---|---|---|---|---|
| 4 | 4 | 8 | 16 | 3 | 13 | 8 | 8 | 32 | 32 |

(c) 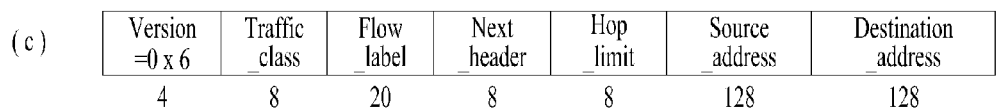

| Version =0 x 6 | Traffic _class | Flow _label | Next _header | Hop _limit | Source _address | Destination _address |
|---|---|---|---|---|---|---|
| 4 | 8 | 20 | 8 | 8 | 128 | 128 |

(d) 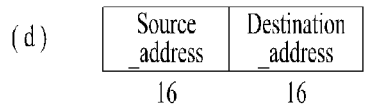

| Source _address | Destination _address |
|---|---|
| 16 | 16 |

FIG. 5

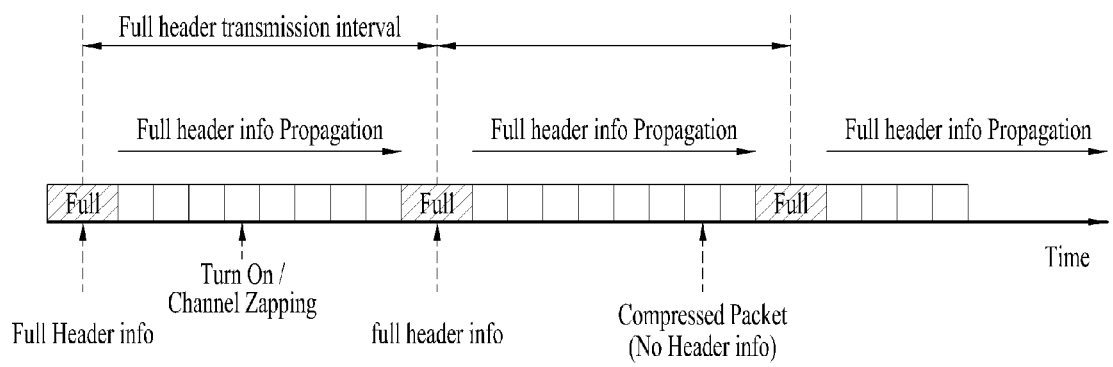

FIG. 9

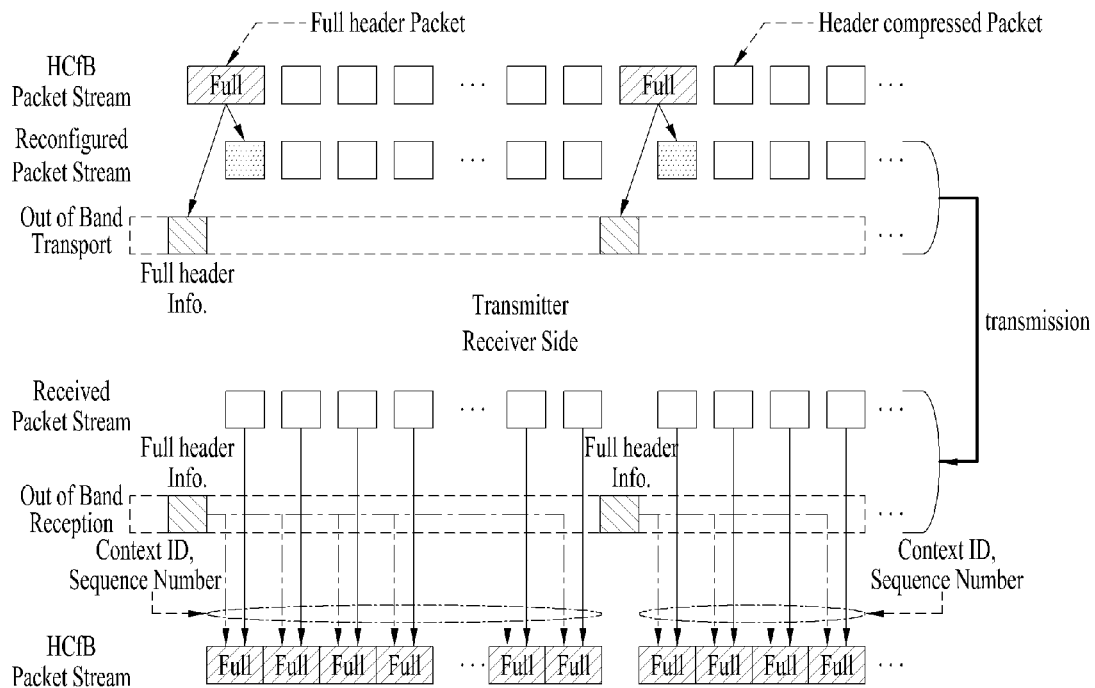

| Mode<br>Transport | Full Header Info. | Header<br>Compressed Packet |
|---|---|---|
| Mode 1 | Signaling | Normal Data Pipe |
| Mode 2 | Base Data Pipe | |
| Mode 3 | Normal Data Pipe | |

(b)

| Value | Description |
|---|---|
| 0x00 - 0x1F | Reserved |
| 0x20 | Full header of packet with IPv4 and UDP headers |
| 0x21 | Compressed header of packet with IPv4 and UDP headers |
| 0x22 | Extracted full header information from IPv4 and UDP headers |
| 0x23 - 0x5F | Reserved |
| 0x60 | Full header of packet with IPv6 and UDP headers |
| 0x61 | Compressed header of packet with IPv6 and UDP headers |
| 0x62 | Extracted full header information from IPv6 and UDP headers |
| 0x63 - 0x5F | Reserved |

| Syntax | No. of Bits | Format |
|---|---|---|
| HCfB_full_header_descriptor ( ) { | | |
|     descriptor_tag | 8 | uimsbf |
|     descriptor_length | 8 | uimsbf |
|     CID | 12 | uimsbf |
|     SN | 4 | uimsbf |
|     CID_header_type | 8 | uimsbf |
|     If ( CID_header_type == 0x22) { | | |
|         IPv4_header_wo_length ( ) | 128 | |
|         UDP_header_wo_length ( ) | 32 | |
|     } | | |
|     else If ( CID_header_type == 0x62) { | | |
|         IPv6_header_wo_length ( ) | 304 | |
|         UDP_header_wo_length ( ) | 32 | |
|     } | | |
| } | | |

METHOD AND DEVICE FOR TRANSMITTING/RECEIVING BROADCAST SIGNAL

CROSS REFERENCE TO RELATED APPLICATIONS

This application is the National Phase of PCT International Application No. PCT/KR2015/002363, filed Mar. 11, 2015, which claims priority under 35 U.S.C. 119(e) to U.S. Provisional Application No. 61/951,507, filed on Mar. 11, 2014, all of which are hereby expressly incorporated by reference into the present application.

TECHNICAL FIELD

The present invention relates to a method of transmitting and receiving a broadcast signal and an apparatus therefor. More particularly, in case of using an IP (internet protocol) packet in a broadcasting system, the present invention relates to a method of efficiently compressing an IP header and an apparatus therefor.

BACKGROUND ART

Recently, transmission/reception of an IP-based broadcast signal has been expanded in a digital broadcasting system. In particular, in a mobile digital broadcasting such as DVB-NGH among European broadcasting standard or ATSC-MH among North American broadcasting standard, the importance of transmission/reception environment of the IP-based broadcast signal is emphasized. And, it is expected that a broadcasting system providing a service in a manner of interworking a broadcast network and the internet with each other, i.e., a hybrid broadcasting system, will be constructed in a next generation broadcasting system.

It is necessary for the next generation broadcasting system to process broadcast signals of various protocols transmitted from a plurality of sources or data. In this process, transmission of broadcast signal or data may be overloaded. Hence, it is necessary to have a method of reducing overhead of transmitted broadcast signal or data.

DISCLOSURE OF THE INVENTION

Technical Tasks

A technical task of the present invention is to solve the aforementioned problem. Another technical task of the present invention is to provide a method of transmitting and receiving a broadcasting IP packet to which overhead reduction is applied and an apparatus therefor.

The other technical task of the present invention is to provide a method of decoding an IP packet irrespective of a type of the IP packet, which is received when a broadcast receiver is switching to a specific channel or is turned on, in uni-directional transmission broadcasting environment and an apparatus therefor.

Technical Solution

To achieve these and other advantages and in accordance with the purpose of the present invention, as embodied and broadly described, according to one embodiment, a broadcast signal transmission processing device includes a header compression unit configured to generate full header packets and compressed header packets in a manner of performing header compression on IP (internet protocol) packets including broadcast data, a full header information extracting unit configured to extract full header information from the full header packets, a signaling data generating unit configured to generate signaling packets including the full header information and a broadcast signal transmitting unit configured to transmit the compressed header packets via a first transmission path on which a general broadcast data is transmitted and transmit the signaling packets via a separate second transmission path different from the first transmission path. In this case, the signaling packets include first signaling information indicating that the signaling packets include the full header information.

Preferably, the full header extracting unit is configured to convert a full header packet from which the full header information is extracted into a compressed header packet and the broadcast signal transmitting unit is configured to transmit the converted compressed header packet via the first transmission path.

Preferably, the first transmission path may correspond to a normal DP (data pipe) and the second transmission path may correspond to a base DP or a signaling channel designated to transmit a signaling data.

Preferably, the signaling data generating unit is further configured to generate a transmission parameter and the transmission parameter includes information on a transport mode to identify whether the second transmission path corresponds to the base DP or the signaling channel.

To further achieve these and other advantages and in accordance with the purpose of the present invention, according to one embodiment, a broadcast signal reception processing device includes a broadcast signal receiving unit configured to receive compressed header packets via a first transmission path on which a general broadcast data is transmitted and receive signaling packets including full header information via a separate second transmission path different from the first transmission path, a signaling parser configured to extract the full header information from the signaling packets, in this case, the signaling packets include first signaling information indicating that the signaling packets include the full header information, a full header information recovering unit configured to convert a part of the compressed header packets into full header packets using the extracted full header information, and a header recovering unit configured to recover IP (internet protocol) packets including broadcast data using the recovered full header packets and the rest of packets of the compressed header packets.

Preferably, the full header information includes a CID (context identification) element indicating a transmission path of an IP packet and an SN (sequence number) element indicating an order of an IP packet in each packet including an identical CID.

Preferably, the full header information recovering unit is configured to convert a part of the compressed header packets, which includes a CID element and an SN element including a value identical to a value of the CID element and a value of the SN element included in the full header information, into full header packets using the full header information.

Preferably, the first transmission path may correspond to a normal DP (data pipe) and the second transmission path may correspond to a base DP or a signaling channel designated to transmit a signaling data.

Preferably, the broadcast signal receiving unit is further configured to receive a transmission parameter and the transmission parameter includes information on a transport mode to identify whether the second transmission path corresponds to the base DP or the signaling channel.

Preferably, the signaling parser is configured to parse the information on the transport mode and extract the full header information from the base DP or the signaling channel indicated by the information on the transport mode.

To further achieve these and other advantages and in accordance with the purpose of the present invention, according to a different embodiment, a broadcast signal transmission processing device includes a header compression unit configured to extract full header information in a manner of performing header compression on IP (internet protocol) packets including broadcast data and generate compressed header packets, a signaling data generating unit configured to generate signaling packets including the full header information, and a broadcast signal transmitting unit configured to transmit the compressed header packets via a first transmission path on which a general broadcast data is transmitted and transmit the signaling packets via a separate second transmission path different from the first transmission path. In this case, the signaling packets include first signaling information indicating that the signaling packets include the full header information.

Preferably, the first transmission path may correspond to a normal DP (data pipe) and the second transmission path may correspond to a base DP or a signaling channel designated to transmit a signaling data.

Preferably, the signaling data generating unit is further configured to generate a transmission parameter and the transmission parameter includes information on a transport mode to identify whether the second transmission path corresponds to the base DP or the signaling channel.

Advantageous Effects

According to the present invention, it is able to increase transmission efficiency in a process of transmitting and receiving a broadcasting IP packet to which overhead reduction is applied.

According to the present invention, it is able to decode an IP packet irrespective of a type of the IP packet, which is received when a broadcast receiver is switching to a specific channel or is turned on, in uni-directional transmission broadcasting environment.

According to the present invention, it is able to reduce latency of a broadcast signal, which is occurred when a broadcast receiver is switched to a specific channel or is turned on, in uni-directional transmission broadcasting environment.

DESCRIPTION OF DRAWINGS

FIG. 4 is a diagram for explaining an element included in an HCfB packet according to one embodiment of the present invention;

FIG. 5 is a diagram for a procedure of propagating full header context information of an HCfB packet according to one embodiment of the present invention;

FIG. 9 is a diagram for a procedure of configuring and restoring a packet stream according to a different embodiment of the present invention;

FIG. 10 is a diagram for a mode of delivering full header information and a definition according to a value of CID_header_type according to one embodiment of the present invention;

BEST MODE

Figure 1:
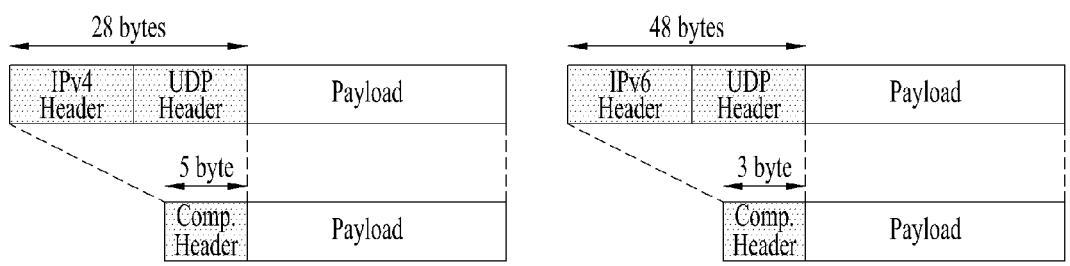
FIG. 1 is a diagram for comparing an IP packet including a not-compressed header with an IP packet including a compressed header according to an IP version in accordance with one embodiment of the present invention.

Reference will now be made in detail to the preferred embodiments of the present invention, examples of which are illustrated in the accompanying drawings. Yet, the present invention may be non-limited or non-restricted by the embodiments.

Although terminologies used in the present specification are selected from general terminologies used currently and widely in consideration of functions, they may be changed in accordance with intentions of technicians engaged in the corresponding fields, customs, advents of new technologies and the like. Occasionally, some terminologies may be arbitrarily selected by the applicant(s). In this case, the meanings of the arbitrarily selected terminologies shall be described in the corresponding part of the detailed description of the specification. Therefore, terminologies used in the present specification need to be construed based on the substantial meanings of the corresponding terminologies and the overall matters disclosed in the present specification rather than construed as simple names of the terminologies.

In the present specification, 'signaling' may refer to transmission/reception of service information (SI) provided by a broadcasting system, an internet broadcasting system and/or a system with which the broadcasting system and the internet broadcasting system are integrated. The service information includes broadcast service information (e.g., ATSC-SI and/or DVB-SI) provided by each of currently existing broadcasting systems.

In the present specification, 'broadcast signal' is defined as a concept including a signal and/or a data provided by bi-directional broadcasting such as internet broadcasting, broadband broadcasting, communication broadcasting, data broadcasting and/or VOD (video on demand) as well as terrestrial broadcasting, cable broadcasting, satellite broadcasting and/or mobile broadcasting.

In the present specification, 'PLP' may refer to a prescribed unit for transmitting data belonging to a physical layer. Hence, contents of the present specification described as 'PLP' can be replaced with such a terminology as 'data unit' or 'data pipe'.

A hybrid broadcasting service, which is provided by interworking a broadcast network and an internet network, may correspond to one of convincing applications to be utilized in a digital broadcasting (DTV) service. The hybrid broadcasting service transmits enhancement data related to broadcast A/V (audio/video) contents, which are transmitted via a terrestrial broadcasting network, or a part of the broadcast A/V contents in real time via an internet network and enables a user to experience various contents.

In order to reduce overhead of an IP packet transmitted via a broadcast system, it may use a method of compressing a header part of an IP. An HCfB (Header Compression for Broadcasting) scheme, which is one of IP compression schemes, enables a data to be transmitted by reducing overhead of an IP (internet protocol)/UDP (user datagram protocol) packet mainly used in a broadcast system.

According to the HCfB scheme, a packet including a full header and a packet including a compressed header are transmitted, respectively. A full header may correspond to all data included in a header of the IP/UDP packet or data included in the header except length information. A compressed header excludes most of header information and may be able to include context ID information indicating a relation with the full header. In a general broadcast system, a packet including a full header is transmitted with a long interval and most of packets are transmitted in a manner of including a compressed header. By doing so, an amount of transmitted data can be reduced. When a receiver receives a packet including a compressed header, most part of a packet header can be restored using information included in a previously received full header.

Despite of effectiveness capable of reducing an amount of transmitted data, if the aforementioned scheme is used for a broadcast system, a broadcast receiver may be unable to receive an IP stream at certain timing due to a transmission characteristic such as multicast via a broadcasting network. A receiver, which is unaware of information on a full header (e.g., a receiver starts to receive an IP packet appearing after an IP packet carrying the full header), is unable to recognize the IP packet or is unable to restore a header of the IP packet. If channel switching occurs in the aforementioned receiver, maximum delay as much as a transmission interval of a full header may occur. In particular, when switching of a channel is performed, the receiver may be unable to process data of the channel until the receiver receives an IP packet including a full header in an IP stream transmitted on the channel.

FIG. 1 is a diagram for comparing an IP packet including a not-compressed header with an IP packet including a compressed header according to an IP version in accordance with one embodiment of the present invention.

Referring to FIG. 1, it shows a summary of a compression scheme of an HCfB scheme among IP header compression schemes. In the HCfB scheme, it may be able to define a compression scheme for two protocols including IPv4/UPD and IPv6/UDP.

As mentioned in the foregoing description, the present invention relates to a method of applying IP header compression to support efficient IP transmission and efficiently applying the IP header compression to a broadcast system and an apparatus therefor. An HCfB (Header Compression for Broadcasting) scheme, which is designed in consideration of a broadcast system, can be defined together with TLV (Type-Length-Value) corresponding to an encapsulation scheme. This can be defined by ITU-R BT. 1869 document (Multiplexing scheme for variable-length packets in digital multimedia broadcasting systems). Parts of the present invention, which are not explained in detail, can be comprehended with reference to contents of the above document.

When IP streaming is performed, such information as an IP version, an IP source address, an IP destination address, an IP fragment flag, a UDP source port, a UDP destination port is not changed. Among information included in an IP header or a UDP header, a field including information not changed in a transmission process can be called a static field. Most of IP compression schemes perform compression in a manner of transmitting the static field one time and not performing additional transmission of the static field for a while.

A broadcasting system using the HCfB supports transmission of two packets including a full header packet (a packet including a full header) and a compressed header packet (a packet including a compressed header). The full header packet is transmitted with a longer transmission interval (the fill header packet is transmitted in a manner of extending a transmission interval) and transmission is performed centering on the compressed header packet. In this case, in case of a packet of IPv4, a size of a full header corresponds to 28 bytes but a size of a compressed header corresponds to 5 bytes only. In case of a packet of IPv6, a size of a full header corresponds to 48 bytes but a size of a compressed header corresponds to 3 bytes only.

Figure 2:
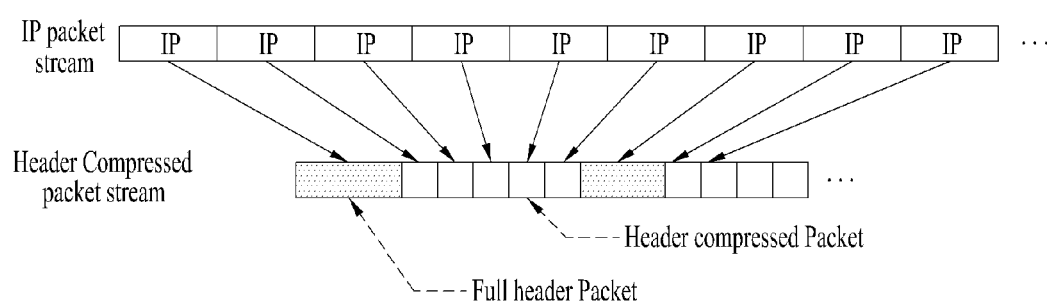
FIG. 2 is a diagram for a concept of an HCfB scheme according to one embodiment of the present invention.

FIG. 2 is a diagram for a concept of an HCfB scheme according to one embodiment of the present invention.

A full header packet is transmitted with a predetermined long transmission interval and the rest of packets are transmitted by a header compressed packet (or a compressed header packet) consisting of minimum information. By doing so, in case of IPv4/UDP, it may be able to reduce overhead as much as 23 bytes per packet. In case of IPv6/UDP, it may be able to reduce overhead as much as 45 bytes per packet.

For example, in case of transmitting a plurality of IP packets via an IP stream, a broadcasting system (a broadcasting transmitter and/or a broadcasting receiver) transmits a full header packet one time at the start point of the IP stream and may be able to transmit a compressed header packet during the rest of prescribed period. In particular, a transmission interval of the full header packet is longer than a transmission interval of the compressed header packet.

Figure 3:
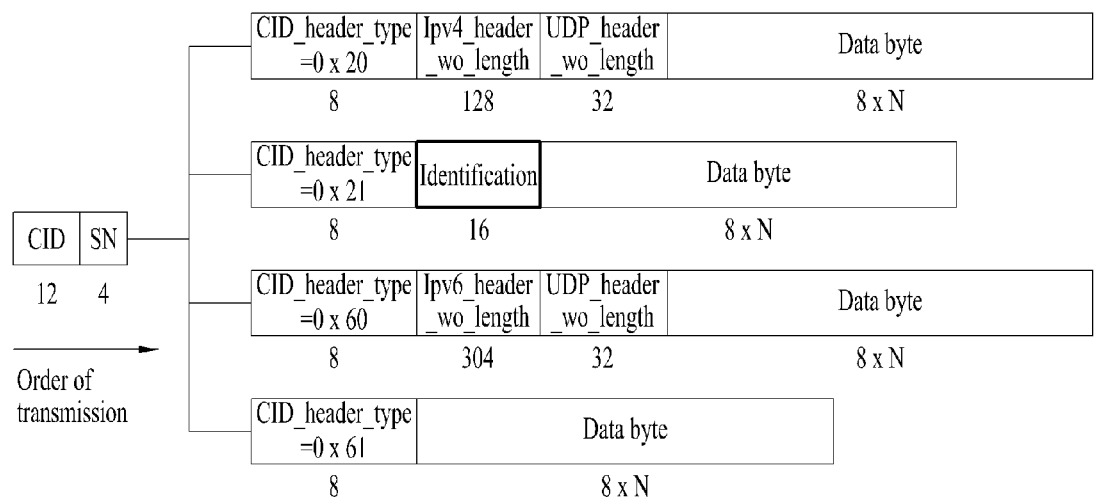
FIG. 3 is a diagram for a packet to which HCfB is applied according to one embodiment of the present invention.

FIG. 3 is a diagram for a packet to which HCfB is applied according to one embodiment of the present invention.

Referring to FIG. 3, it shows a form of propagating information of a header enabling a receiver to obtain information of a full header in a process of transmitting a packet stream.

An HCfB packet (an IP packet to which HCfB is applied) can include a CID (context identification) element, an SN (sequence number) element, a CID_header_type element, an identification element, an IPv4_header_wo_length ( ) element, an IPv6_header_wo_length ( ) element, an UDP_header_wo_length ( ) element and/or a data byte (or payload).

The CID (context identification) element includes information indicating IP transmission (flow). The CID element shows IP flows capable of being divided into a source IP address, a destination IP address, a protocol, a source port number and/or a destination port number for the IPv4. The CID element shows IP flows capable of being divided into a source IP address, a destination IP address, a next_header, a source port number and/or a destination port number for the IPv6.

The SN (sequence number) element has an increasing value for each packet including an identical CID. The value is continuously iterated in each packet in a manner that the value becomes 0 after a maximum value. The SN (sequence number) element can indicate an order of IP packets for each of the packets including an identical CID.

The CID_header_type element indicates a form of a header included in a packet. Regarding this, it shall be described later in detail.

The identification element corresponds to an IP identifier for a header of IPv4.

The IPv4_header_wo_length ( ) element includes parts of an IPv4 header except a total_length field and a header_checksum field.

The IPv6_header_wo_length ( ) element includes parts of an IPv6 header except a payload_length field.

The UDP_header_wo_length ( ) element includes parts of a UDP header except a length field and a checksum field.

FIG. 4 is a diagram for explaining an element included in an HCfB packet according to one embodiment of the present invention.

Referring to (a), a CID_header_type element can indicate that a header included in a packet includes a full header and a UDP header of an IPv4 packet, a compressed header and a USD header of the IPv4 packet, a full header and a UDP header of an IPv6 packet or a compressed header and a USD header of the IPv6 packet according to a value of the CID_header_type element.

Referring to (b), an IPv4_header_wo_lenghth ( ) element can include a version element, an IHL element, a type_of_service element, an identification element, a flags element, a fragment_offset element, a time_to_live element, a protocol element, a source_address element and/or a destination_address element.

The version element indicates a format of an IP header. For example, the version element can indicate IPv4.

The IHL element indicates a length of an IP header.

The type_of_service element indicates a parameter for identifying quality of a preferred service.

The identification element indicates an identification value designated by a transmitting side to help fragments of a datagram to be combined with each other.

The flags element indicates various control flags. For example, the flags element can indicate there may exist a fragment, fragmentation is not performed, it is not a fragment, a fragment corresponds to a last fragment, and there exist more fragments.

The fragment_offset element includes information indicating a position of a fragment belonging to a datagram.

The time_to_live element indicates maximum time permitted to a datagram to exist in an internet protocol system (a broadcasting system).

The protocol element indicates a next level protocol used in a data portion of a datagram.

The source_address element indicates a source address.

The destination_address element indicates a destination address.

Referring to (c), an IPv6_header_wo_lenghth ( ) element can include a version element, a traffic_class element, a flow_label element, a next_header element, a hop_limit element, a source_address element and/or a destination_address element.

The version element indicates a version of an IP.

The traffic_class element includes information used in an original node or a forwarding router to distinguish and identify priorities of an IPv6 packet different from each other or classes.

The flow_label element includes information used for a source to label a sequence of such a packet requiring a special control as a non-default quality of service, a real-time service and the like.

The next_header element identifies a type of a header that follows an IPv6 header.

The hop_limit element has a value decreasing by 1 according to transmission of a packet. If the value becomes 0, the hop_limit element indicates that it is necessary to discard a corresponding packet.

The source_address element indicates an address of a source of a packet.

The destination_address element indicates an address of an intended destination of a packet.

Referring to (d), a UDP_header_wo_length ( ) element can include a source_port element and/or a destination_port element.

The source_port element indicates a port number of a source of a packet.

The destination_port element indicates a port number of an intended destination of a packet.

FIG. 5 is a diagram for a procedure of propagating full header context information of an HCfB packet according to one embodiment of the present invention.

Referring to FIG. 5, it shows that information of a full header is propagated in the middle of transmitting an HCfB packet stream. A packet including an initial full header is transmitted and then a packet including a compressed header is transmitted. If a prescribed cycle elapses, a packet including a full header is transmitted again and a receiver can update header information.

Since uni-directional transmission is performed on a general broadcasting channel, power of a receiver is turned on at the time of transmitting a compressed header packet. If a broadcast channel is switched on the receiver, it is unable to decode a corresponding stream until a next full header packet is received. Referring to the drawing, since the receiver has never received information on a full header on the timing represented as Turn ON/Channel Zapping, although the receiver receives a packet including a compressed header, the receiver is unable to restore a header of the packet. Hence, a problem that the receiver is unable to process data from the timing of Turn ON/Channel Zapping to the timing of receiving a next packet including a full header may occur. In order to solve the problem, it is able to transmit full header information on a separate signaling channel.

In order to reduce overhead of IP transmission and efficiently transmit a broadcast signal, the present invention proposes a method for a broadcasting system according to the present invention to transmit a compressed packet using an in-band and transmit a full header part including fixed header information in an IP packet using an out-of-band. Meanwhile, it is necessary to restore an order of packets in a receiver.

Figure 6:
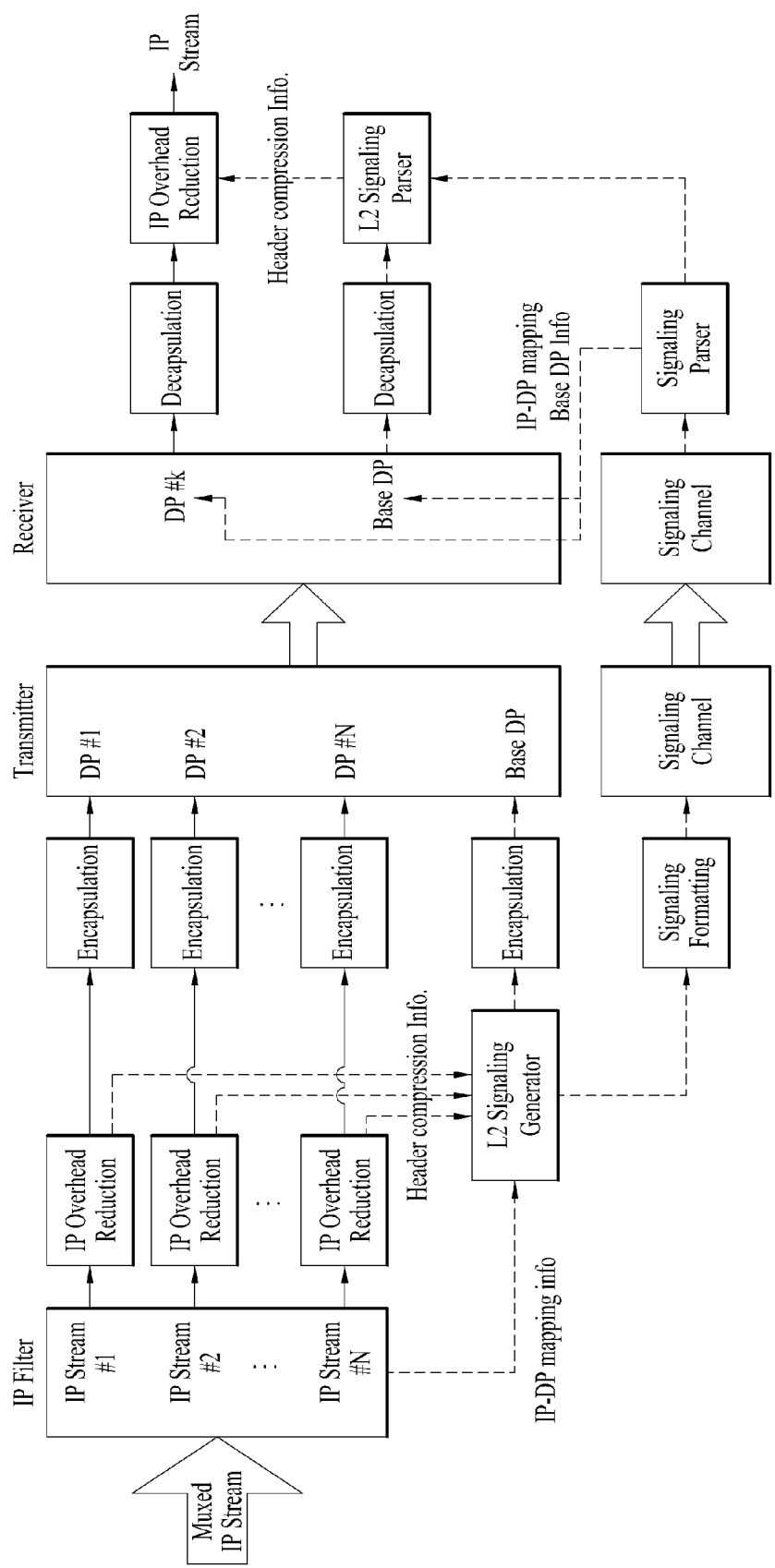
FIG. 6 is a diagram for a transmission/reception system receiving a packet performing IP header compression or a packet on which IP header compression is performed according to one embodiment of the present invention.

FIG. 6 is a diagram for a transmission/reception system receiving a packet performing IP header compression or a packet on which IP header compression is performed according to one embodiment of the present invention.

A system shown in the drawing can be divided into a transmission system (transmitter) and a reception system (receiver).

If IP streams are respectively transmitted via DPs (data pipes) different from each other, information on header compression is delivered to the receiver via an L2 signaling transmission procedure and the information is used by the receiver to restore an original IP stream. The information on the header compression is encapsulated and can be transmitted via a data pipe. In this case, the information on the header compression can be transmitted via a normal DP or a DP for transmitting signaling information (e.g., base DP and/or common DP) according to a structure of a physical layer. In case of being supported by a physical layer, the information on the header compression can be transmitted on a separate signaling channel. In this case, the base DP and/or the common DP include signaling information or data and/or information commonly used by the normal DP. Although the base DP and/or the common DP are transmitted via a broadcast channel together with the normal DP, the base DP and/or the common DP can include an identifier different from an identifier of the normal DP to distinguish the identifier of the base DP and/or the common DP from the identifier of the normal DP.

Referring to the drawing, a transmitter can include an IP filter, an IP overhead reduction unit, an L2 signaling generator, a signaling formatting unit, an encapsulation unit, a transmitter and/or a signaling channel processing unit.

The IP filter receives multiplexed IP streams and separates the IP streams into IP streams. The IP filter generates IP-DP mapping information to signal a DP used for transmitting an IP stream and can deliver the information to the L2 signaling generator generating L2 signaling information.

The IP overhead reduction unit performs overhead reduction in a manner of performing the aforementioned header compression scheme on each of the IP streams. In this procedure, the IP overhead reduction unit can generate header compression-related information.

The L2 signaling generator generates L2 signaling information including information related to header compression.

The signaling formatting unit formats signaling information.

The encapsulation unit encapsulates the IP streams on which overhead reduction is performed.

The transmitter transmits the encapsulated IP streams via a DP.

The signaling channel processing unit transmits signaling information via a signaling channel.

Referring to the drawing, a receiver can include a signaling channel processing unit, a signaling parser, a receiver, a de-capsulation processing unit, an L2 signaling parser, and/or an IP overhead recovery unit.

The signaling channel processing unit receives signaling information transmitted via a signaling channel.

The signaling parser parses signaling information transmitted via a signaling channel. The signaling information can include IP-DP mapping information and/or header compression-related information.

The receiver receives DPs. The receiver identifies a DP transmitting an IP stream required by the receiver using IP-DP mapping information among the received DPs and may be able to extract the DP.

The de-capsulation processing unit performs de-capsulation on a DP and extracts an IP stream and/or an IP packet from the DP.

The L2 signaling parser parses L2 signaling information which is transmitted via a signaling channel or a base DP. The L2 signaling information can include header compression-related information.

The IP overhead recovery unit recovers a compressed IP header using header compression-related information and recovers an IP stream including IP packets in which a full header is included.

The L2 (layer 2) signaling information may correspond to signaling information in a layer after a physical layer. The L2 (layer 2) signaling information can include signaling information for obtaining a broadcasting service, an event, contents, data and/or a program. For example, the L2 (layer 2) signaling information can include PSI/SI information, PSIP information and/or DVB/SI information, etc.

Figure 7:
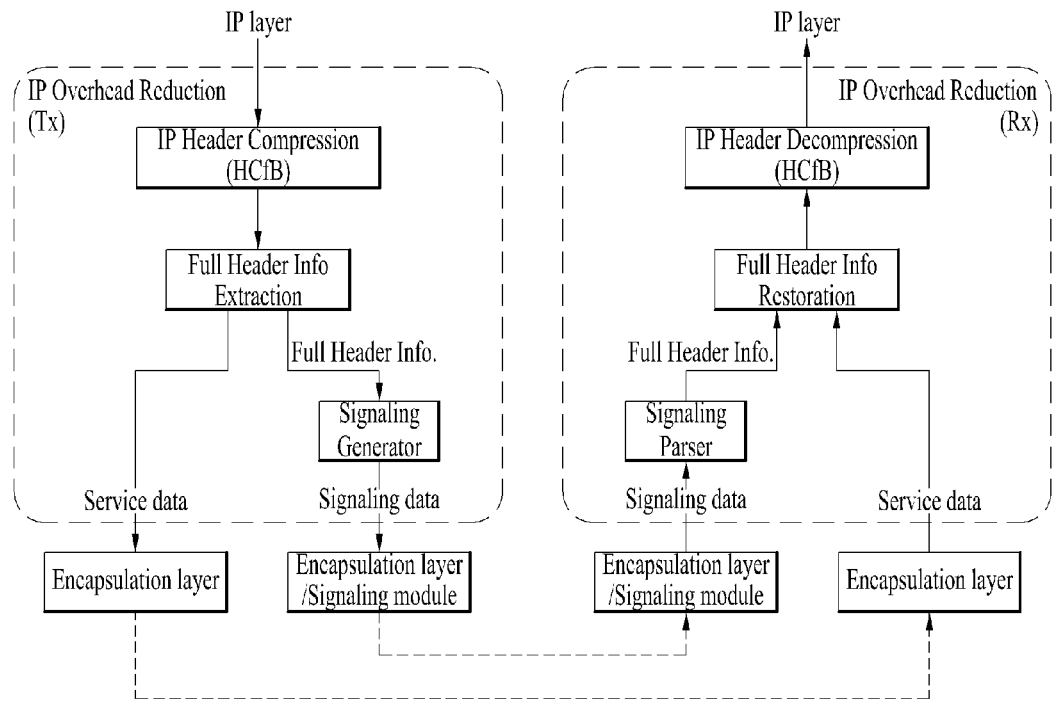
FIG. 7 is a diagram for an IP overhead reduction procedure performed by a transceiver according to one embodiment of the present invention.

FIG. 7 is a diagram for an IP overhead reduction procedure performed by a transceiver according to one embodiment of the present invention.

If an IP stream enters an overhead reduction procedure, an IP header compression unit performs header compression on packets included in the stream. For example, it may be able to use HCfB (Header Compression for Broadcasting) for the header compression, by which the present invention may be non-limited.

A full header information extraction unit extracts full header information from a packet including full header information among packet streams. For example, the full header information extraction unit can generate full header information in a manner of copying or extracting a full header from a full header packet. In particular, full header information can include a full header of a packet.

A signaling generator makes information on a full header, which is extracted from a packet stream, to be a form capable of being transmitted. The signaling generator can perform a different processing according to a region to which the information on the full header (full header information) is transmitted. For example, if the full header information is transmitted via a DP, a processing for transmitting the full header information is performed via the DP. If the full header is transmitted via a signaling channel, full header information matched with a transmission regulation of the signaling channel is generated. The full header information is delivered to an encapsulation layer or a signaling transmission module for transmitting signaling information according to a transmission type. Subsequently, the full header information is delivered to the receiver via a physical layer.

A packet stream, which has underwent a header compression procedure, is delivered to an encapsulation layer, encapsulated and transmitted to the receiver via a physical layer.

An IP overhead reduction unit of the receiver receives and processes a packet stream including a processed service data, a signaling channel and/or a signaling data delivered via a separate DP (data pipe). In this case, the signaling data can include full header information.

A full header restoration unit receives a packet stream and a signaling data and performs full header restoration on a compressed header packet included in the received packet stream using full header information. The full header restoration unit converts the compressed header packet into a full header packet.

An IP header decompression unit restores a packet stream to an original IP stream. The full header restoration unit and the IP header decompression unit can be configured by a single device or a module.

Figure 8:
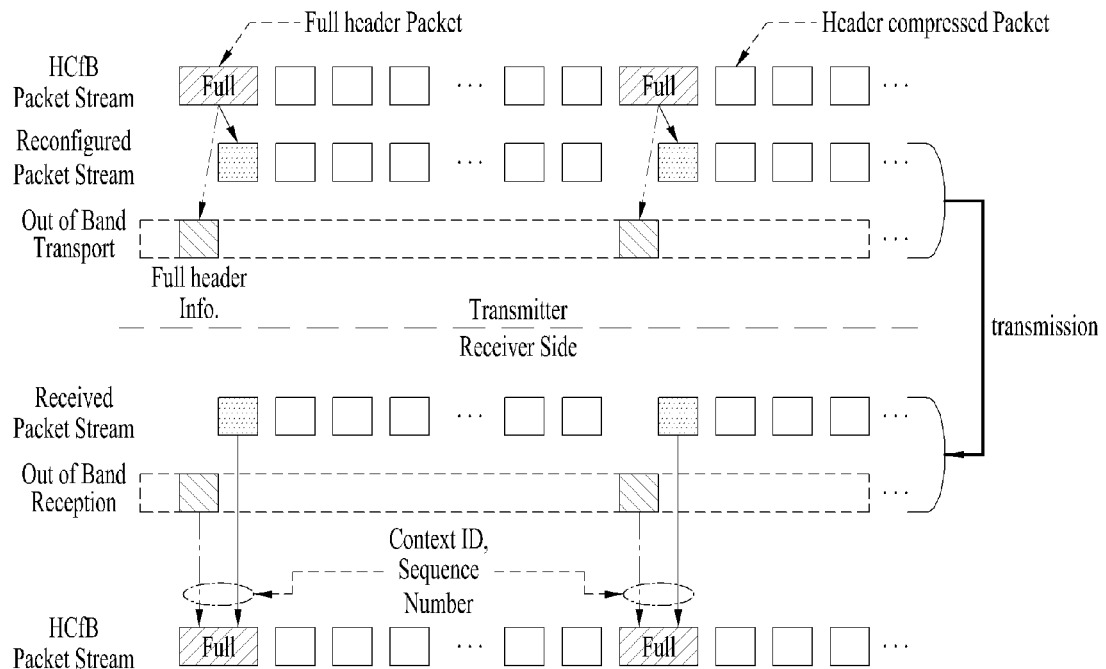
FIG. 8 is a diagram for a procedure of configuring and restoring a packet stream according to one embodiment of the present invention.

FIG. 8 is a diagram for a procedure of configuring and restoring a packet stream according to one embodiment of the present invention.

A compression and restoration procedure for a header of a packet in the aforementioned transceiver system is shown in FIG. 8. Since this procedure can be configured to add a procedure of extracting and combining additional header information without changing a legacy HCfB configuration, it may be able to maintain a compatibility with a legacy HCfB scheme.

Operations of a transmitter are explained in the following.

A transmitter detects a full header packet from packet streams which are generated in a manner of being underwent IP header compression. If IP packets included in an IP stream undergo IP header compression, a part of the IP packets becomes a full header packet and the rest of the IP packets are generated as compressed header packets.

The transmitter generates a compressed packet from a full header packet based on an SN (sequence number) included in the full header packet. The compressed packet can include SN information of a form identical to an SN form of the full header. In this case, the compressed packet may correspond to a remaining data of the full header packet except the full header. Or, the compressed packet may correspond to a packet which is compressed to include information included in a header of a compressed header packet (a packet including the compressed header) only.

The transmitter replaces the generated compressed packet with the full header packet and extracts a CID and/or full header information from the full header packet. The extracted CID and/or the full header information can be transmitted via an out of band. In this case, the out of band may correspond to a transmission path not transmitting data for broadcasting.

The transmitter replaces full header packets in all packet streams with compressed packets through the aforementioned procedure and extracts full header information from each of the full header packets. As mentioned in the foregoing description, each of the extracted full header information can be transmitted to a receiver via a compressed packet and/or a transmission path separated from a compressed header packet. The transmitter transmits a reconfigured packet stream via a DP (data pipe) and transmits the extracted full header information via the out of band in a manner of converting the extracted full header information into a signaling information type.

Operations of a receiver are explained in the following.

A receiver selects a DP (data pipe) of a stream preferred to receive using signaling information.

The receiver detects full header information transmitted via an out of band or a path irrespective of a packet stream.

The receiver detects a packet including an identical SN from packet streams transmitted via a DP (data pipe) based on a CID and an SN included in the extracted full header information. In this case, the detected packet corresponds to the aforementioned compressed packet.

The receiver converts the detected compressed packet into a full header packet using the full header information and performs an IP header decompression procedure.

FIG. 9 is a diagram for a procedure of configuring and restoring a packet stream according to a different embodiment of the present invention.

A compression and restoration procedure for a header of a packet in the aforementioned transceiver system is shown in FIG. 9. Although the present procedure has a change for a legacy HCfB configuration, it is able to more efficiently process data in a procedure of extracting and combining header information.

According to a different embodiment of the present invention, a transmitter operates as follows.

When a transmitter performs IP header compression on an IP stream, a part of IP packets included in the IP stream becomes a full header packet and the rest of IP packets are generated as compressed header packets. The transmitter detects the full header packet from the packet streams generated by the IP header compression.

The transmitter generates a compressed packet from a full header packet based on an SN (sequence number) included in the full header packet. The compressed packet may have SN information of a form identical to an SN of a full header. In this case, the compressed packet may correspond to a remaining data of the full header packet except the full header. Or, the compressed packet may correspond to a packet which is compressed to include information included in a header of a compressed header packet (a packet including the compressed header) only.

The transmitter replaces the generated compressed packet with the full header packet and extracts a CID and/or full header information from the full header packet. The transmitter transmits the full header information via an out of band or a path on which broadcast contents data are transmitted.

The transmitter replaces each of full header packets with a compressed packet through the aforementioned procedure and extracts full header information.

The transmitter can process the aforementioned procedures at a time. For example, the transmitter generates all packets as a compressed header packet in an IP header compression procedure and generates full header information as a separate data. In this case, it is able to represent header compressed packets including identical full header information using a CID value. In particular, the transmitter performs header compression or overhead reduction on all IP packets included in an IP stream and the IP packets are converted into compressed header packets. In this procedure, the transmitter identifies IP packets sharing identical header information with each other using a CID and extracts full header information capable of being commonly applied to the IP packets. The extracted full header information may have a CID identical to a value of a CID included in a compressed header packet. Hence, a receiving side checks a CID value from full header information received via a separate path, checks CDs of received compressed header packets and applies full header information to a compressed header packet of which the CID value is matched. By doing so, it is able to restore an IP packet including a full header.

The transmitter transmits a reconfigured packet stream including a compressed packet via a DP (data pipe), converts extracted full header information into a signaling data and transmits the signaling data using an out of band and/or a signaling channel.

According to a different embodiment of the present invention, a receiver can operate as follows.

A receiver selects a DP (data pipe) transmitting a stream preferred to receive using signaling information.

The receiver detects full header information of a corresponding packet stream which is transmitted using the out of band.

The receiver detects all packets including an identical CID from packet streams transmitted via a DP (data pipe) based on a CID and an SN included in the extracted full header information.

The receiver combines a detected compressed packet or a compressed header packet with the full header information and restores a full header packet and/or an IP packet.

In the above procedure, the receiver checks a CID value of the received full header information, checks a packet including an identical CID from the received packet, applies the full header information to the packet and restores a packet (a full header packet) on which header compression (or overhead reduction) is not performed. Since it is not necessary to have a separate HCfB decompression via the aforementioned procedure, it is able to more efficiently process data.

FIG. 10 is a diagram for a mode of delivering full header information and a definition according to a value of CID_header_type according to one embodiment of the present invention.

A method of delivering full header information, which is extracted from a packet stream, using an out of band includes a method of delivering the information via signaling and a method of delivering the information via a DP (data pipe) (e.g., base DP) on which a parameter necessary for system decoding is delivered.

Referring to (a), it shows a transport mode usable for the two delivery methods including a method of transmitting full header information on a signaling channel and a method of transmitting full header information using a DP.

As shown in (a), it may be able to designate a transport mode among a transport mode #1 to #3 depending on a transmission path on which full header information is transmitted. Information for identifying the transport mode can be transmitted via a transmission parameter of a physical channel, L2 signaling and/or PSI/SI information channel.

A transport mode 1 (transport mode #1) corresponds to a scheme of delivering full header information via signaling information. In the transport mode 1, a compressed header packet or a compressed packet can be transmitted via a DP corresponding to a transmission path on which general data is transmitted.

A transport mode 2 (transport mode #2) corresponds to a scheme of delivering full header information via a base DP. In the transport mode 2, a compressed header packet or a compressed packet can be transmitted via a DP corresponding to a transmission path on which general data is transmitted.

Similar to legacy HCfB transmission, a transport mode 3 (transport mode #3) corresponds to a scheme of transmitting a full header packet and a compressed header packet instead of a scheme of transmitting full header information via a separate channel.

Each of the transport modes can be changed (switching) in accordance with a situation of a broadcasting system via separate signaling. Or, it may be able to fixedly use a single transport mode only in a broadcasting system.

Referring to (b), in order to transmit full header information using a separate transmission path different from a legacy transmission path and/or a transmission format, it may be able to signal information on a transmission path and/or a transmission format using a CID_header_type element.

In the aforementioned CID_header_type element, it may be able to add a value of the CID_header_type element to signal a transport mode proposed by the present invention. For example, if a value of the CID_header_type element corresponds to 0x22, it may be able to indicate that full header information extracted from IPv4/UDP header information is included in a corresponding packet. If a value of the CID_header_type element corresponds to 0x62, it may be able to indicate that full header information extracted from IPv6/UDP header information is included in a corresponding packet.

Figures 11, 12:
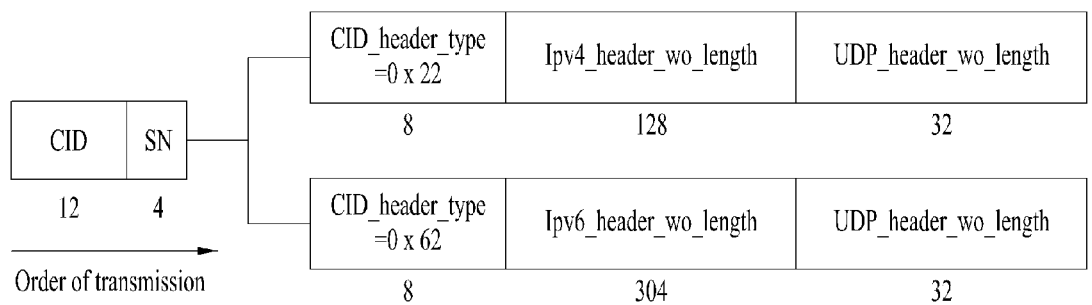
FIG. 11 is a diagram for full header information according to one embodiment of the present invention.
FIG. 12 is a diagram for a packet including full header information according to one embodiment of the present invention.

FIG. 11 is a diagram for full header information according to one embodiment of the present invention.

Full header information or full header-related information can include all or a part of signaling information included in the present drawing.

Although full header information is explained by a descriptor form in the present drawing, the full header information can also be configured in an XML form.

A full header information descriptor according to one embodiment of the present invention can include a CID element, an SN element, a CID_header_type element, an IPv4_header_wo_length ( ) element, an UDP_header_wo_length ( ) element, and/or an IPv6_header_wo_length ( ) element.

The CID (context identification) element indicates an IP flow capable of dividing IPv4 into a source IP address, a destination IP address, a protocol, a source port number and/or a destination port number. The CID (context identification) element indicates an IP flow capable of dividing IPv6 into a source IP address, a destination IP address, a next_header, a source port number and/or a destination port.

The SN (sequence number) element has an increasing value for each packet including an identical CID. The value is continuously iterated in each packet in a manner that the value becomes 0 after a maximum value.

The CID_header_type element indicates a form of a header included in a packet. For detail explanation on the CID_header_type element, it may refer to the aforementioned explanation.

The IPv4_header_wo_length ( ) element includes an IPv4 header from which a total_length field and a header_checksum field are excluded.

The IPv6_header_wo_length ( ) element includes an IPv6 header from which a payload_length field is excluded.

The UDP_header_wo_length ( ) element includes an UDP header from which a length field and a checksum field are excluded.

If ITU-R BT.1869 standard changes, contents of each element (or field) may change in accordance with the standard. And, a full header information descriptor can be included as a part of a section table or can be configured as a separate section table if necessary in the future.

FIG. 12 is a diagram for a packet including full header information according to one embodiment of the present invention.

Explanation on each element shown in the drawing is replaced with the aforementioned explanation.

As mentioned in the foregoing description, in order to transmit extracted full header information using a separate path, it may be able to configure a format of a packet. In this case, it may be able to add information capable of indicating that the packet corresponds to a packet including the full header information to a header. The information capable of indicating that the packet corresponds to a packet including the full header information can include a CID, an SN, CID_header_type information (element) of the packet.

Referring to the drawing, since a CID of a packet including full header information corresponds to 12, it indicates that the full header information can be applied to a packet including a CID value of 12 among packets including broadcast data, which is transmitted via a normal DP and the like. It is able to identify whether transmitted full header information is used for IPv4/DP or IPv6/UDP via the CID_header_type field. As mentioned in the scheme proposed by the present invention, a receiver is able to know that the full header information is transmitted via a path different from a path on which broadcast data is transmitted according to a value of the CID_header_type field.

All method inventions according to the present invention are implemented in a form of program commands capable of being performed through various computer means and recorded in a medium readable by a computer.

The medium readable by a computer can include a program command, a data file, a data structure and the like individually or a combination thereof. The program commands recorded in the medium can be specially designed for the present invention or may be usable in a manner of being notified to those skilled in computer software. Examples of the recording medium readable by a computer include a magnetic media such as a hard disk, a floppy disk and a magnetic tape, an optical media such as a CD-ROM and a DVD, a magneto-optical media such as a floptical disk and such a hardware device specifically configured to store and perform a program command as a ROM, a RAM, a flash memory and the like. Examples of the program command include not only a machine code compiled by a compiler but also a high level language code capable of being executed using an interpreter and the like. The aforementioned hardware device can be configured to operate as one or more software modules to perform operations of the present invention and vice versa.

While the present specification has been described and illustrated herein with reference to the preferred embodiments and diagrams thereof, the present specification may be non-limited to the aforementioned embodiments and it will be apparent to those skilled in the art that various modifications and variations can be made therein without departing from the spirit and scope of the present specification. Thus, it is intended that the present specification covers the modifications and variations of this invention that come within the scope of the appended claims and their equivalents.

MODE FOR INVENTION

As mentioned in the foregoing description, a mode for invention is described in the best mode for invention.

INDUSTRIAL APPLICABILITY

The present invention is usable throughout a broadcasting industry.

What is claimed is:

1. A broadcast signal transmission processing device, the device comprising:
   a header compression processor that generates full header packets and first compressed header packets in a manner of performing header compression on Internet protocol (IP) packets containing broadcast data;
   a full header information extracting processor that extracts full header information from the full header packets and converts the full header packets from which the full header information is extracted to second compressed header packets;
   a signaling data generating processor that generates signaling packets containing information related to the header compression; and
   a broadcast signal transmitting processor that transmits a broadcast signal including multiple data pipes,
   wherein the information related to the header compression includes mode information,
   wherein, when the mode information indicates a first mode, one of the multiple data pipes carries the signaling packets including the information related to the header compression and remaining ones of the multiple data pipes carry the full header packets including the full header information and the first compressed header packets, and
   wherein, when the mode information indicates a second mode, one of the multiple data pipes carries the signaling packets including the information related to the header compression and the full header information extracted from the full header packets, and remaining ones of the multiple data pipes carry the first compressed header packets and the second compressed header packets.

2. The broadcast signal transmission processing device of claim 1, wherein the information related to the header compression further includes context identification information identifying compressed flow including the full header packets and configuration identification information indicating whether the extracted full header information is included in the signaling packets.

3. A broadcast signal reception processing device, the device comprising:
   a broadcast signal receiving processor that receives a broadcast signal including multiple data pipes that include broadcast data and information related to header compression,
   wherein the information related to the header compression includes mode information,
   wherein, when the mode information indicates a first mode, one of the multiple data pipes carries signaling packets including the information related to the header compression and remaining ones of the multiple data pipes carry full header packets including full header information and first compressed header packets, and
   wherein, when the mode information indicates a second mode, one of the multiple data pipes carries the signaling packets including the information related to the header compression and the full header information extracted from the full header packets, and remaining ones of the multiple data pipes carry the first compressed header packets and second compressed header packets;
   a signaling parser that extracts the full header information from the signaling packets;
   a full header information recovering processor that converts the second compressed header packets into the full header packets using the extracted full header information; and
   a header recovering processor that recovers Internet protocol (IP) packets containing the broadcast data,
   wherein, when the mode information indicates the first mode, the IP packets are recovered using the received full header packets and the first compressed header packets, and
   wherein, when the mode information indicates the second mode, the IP packets are recovered using the converted full header packets and the first compressed header packets.

4. The broadcast signal reception processing device of claim 3, wherein the information related to the header compression further includes context identification information identifying compressed flow including the full header packets and configuration identification information indicating whether the extracted full header information is included in the signaling packets.

5. A broadcast signal transmission processing method, the method comprising:
   generating full header packets and first compressed header packets in a manner of performing header compression on Internet protocol (IP) packets containing broadcast data;
   extracting full header information from the full header packets and converting the full header packets from which the full header information is extracted to second compressed header packets;
   generating signaling packets containing information related to the header compression; and
   transmitting a broadcast signal including multiple data pipes, wherein the information related to the header compression includes mode information, wherein, when the mode information indicates a first mode, one of the multiple data pipes carries the signaling packets including the information related to the header compression and remaining ones of the multiple data pipes carry the full header packets including the full header information and the first compressed header packets, and wherein, when the mode information indicates a second mode, one of the multiple data pipes carries the signaling packets including the information related to the header compression and the full header information extracted from the full header packets, and remaining ones of the multiple data pipes carry the first compressed header packets and the second compressed header packets.

6. The broadcast signal transmission processing method of claim 5, wherein the information related to the header compression further includes context identification information identifying compressed flow including the full header packets and configuration identification information indicating whether the extracted full header information is included in the signaling packets.

7. A broadcast signal reception processing method, the method comprising:

receiving a broadcast signal including multiple data pipes that include broadcast data and information related to header compression, wherein the information related to the header compression includes mode information, wherein, when the mode information indicates a first mode, one of the multiple data pipes carries signaling packets including the information related to the header compression and remaining ones of the multiple data pipes carry full header packets including full header information and first compressed header packets, and wherein, when the mode information indicates a second mode, one of the multiple data pipes carries the signaling packets including the information related to the header compression and the full header information extracted from the full header packets, and remaining ones of the multiple data pipes carry the first compressed header packets and second compressed header packets;

extracting the full header information from the signaling packets;

converting the second compressed header packets into the full header packets using the extracted full header information; and recovering Internet protocol (IP) packets containing the broadcast data, wherein, when the mode information indicates the first mode, the IP packets are recovered using the received full header packets and the first compressed header packets, and wherein, when the mode information indicates the second mode, the IP packets are recovered using the converted full header packets and the first compressed header packets.

8. The broadcast signal reception processing method of claim 7, wherein the information related to the header compression further includes context identification information identifying compressed flow including the full header packets and configuration identification information indicating whether the extracted full header information is included in the signaling packets.

* * * * *